Patented Mar. 12, 1940

2,193,464

UNITED STATES PATENT OFFICE 2,193,464

CATALYST FOR CHEMICAL REACTIONS IN WHICH PARTICIPATE CARBON OXIDES

Giulio Natta, Milan, Italy

No Drawing. Application June 9, 1937, Serial No. 147,253. In Italy June 10, 1936

8 Claims. (Cl. 23—237)

It is well known that zinc oxide is a catalyst suitable for promoting certain reactions in which carbon monoxide and carbon dioxide participate and in which a too strong reducing reaction, forming elementary carbon and methane, is to be avoided. Zinc oxide is actually one of the principal constituents of many known catalysts which promote the following reactions:

$$CO+2H_2=CH_3OH$$
$$CO_2+3H_2=CH_3OH+H_2O$$
$$CO+H_2O=CO_2+H_2$$

It is, however, also known that zinc oxide prepared by ordinary methods, as well as commercial zinc oxide, is not suitable for practical realization of such reactions for the commercial production of hydrogen and methanol on account of its catalytic activity rapidly decreasing in the course of working. The reduction of catalytic activity in respect of useful reactions increases almost proportionately to the trend toward promoting secondary and noxious reactions.

A stronger and more lasting activity is sometimes obtained by adding promoters (in most cases metallic oxides) but as these are inert or noxious substances, from the catalytic standpoint, in respect of the desired reactions, their function is often simply protective on zinc oxide, and they often cause secondary reactions (formation of organic products of higher molecular weight in the synthesis of methanol, or formation of methane in such synthesis, or in the conversion of the carbon monoxide into hydrogen under pressure).

Until now catalysts composed only of zinc oxide and having a lasting activity were little known. An exception was the zinc oxide obtained from smithsonite, but this is a natural product, which cannot easily be obtained in pure form and which is not obtainable artificially in form of neutral, compact, and crystalline carbonate. All the types of zinc oxide prepared artificially show a catalytic activity which rapidly decreases in the course of time and further do not possess properties of mechanical resistance which are desired for catalysts for use on a commercial basis.

It has been found now that by the calcination at a low temperature (200-350° C.) of organic zinc salts, the decomposing temperature of which is higher than their melting temperature, products can be obtained which show a catalytic activity which is very strong and very durable. For instance zinc acetate (melting temperature 240°) decomposes at nearly 280°-300° and produces an excellent catalyst. After the calcination has been performed, the catalyst composed essentially of zinc oxide, is agglomerated and has after grinding a granular porous structure and favorable mechanical properties. This particular structure is due to the fact that zinc oxide segregates from a melted mass, the melting temperature of the acetate being lower than 240° and it is produced, therefore, as a porous and agglomerated mass (not in form of powder as the calcined and precipitated products). On account of this physical structure, no further physical or mechanical treatment is required for the preparation of the catalyst, and no agglomerating agent is necessary nor pressing into tablets, etc.

However, the products obtained by calcination of organic zinc salts which decompose before melting (for instance formate and oxalate of zinc) appear in form of powder and do not show the same advantages from the catalytic point of view as the products obtained by calcination of fusible organic zinc salts (for instance zinc acetate).

The catalysts now proposed have a very high grade of activity for the synthesis of methanol by reaction of carbon oxide with hydrogen under pressure, and may be used as well for the production of hydrogen by reaction of carbon monoxide with steam, in some cases under pressure.

For this reason they are preferred to any catalyst obtained by precipitation of zinc salts with alkali, which have a minor specific activity for the synthesis of the methanol and promote secondary reactions on account of the presence of traces of alkali, which are strongly retained in the precipitates and cannot be removed by simple washing.

It is well known that the presence of alkali, or even traces of same, promotes the formation by synthesis of carbon monoxide and hydrogen, of higher alcohols, aldehydes, acids, ethers, etc. It is very easy to obtain zinc acetate free of alkali by solution of the metal in acetic acid, or much more economically by the solution of the mineral calamine (smithsonite), lightly calcined. In order to evaporate the solutions of zinc acetate obtained in this way and after drying in order to eliminate the water of the crystallisation, it is sufficient to heat at relatively low temperatures (nearly 300°) for the preparation of the catalyst. The zinc acetate first melts and then decomposes according to the following reaction: $(CH_3COO)_2Zn=ZnO+CO_2+CH_3COCH_3$.

The acetone which is formed according to the preceding reaction can be recovered thus reducing the cost of production of the catalyst, which is already low.

It will be convenient to carry on the reaction at the lowest possible temperature, in an atmosphere of inert or reducing gas, at normal pressure or still better, at a higher pressure.

If during the preparation of the catalyst pure zinc acetate is not used and substances are present which do not combine with the zinc oxide, at a low temperature, these substances can be noxious to the use of the catalyst, if they cause specific unfavourable reactions, especially by promoting secondary reactions, which are not desired. Thus, the presence of metals of the iron group, which are often present in the zinc ores, is noxious. These metals are, however, easily eliminated from the neutral solutions of zinc salts using an excess of zinc oxide and of metallic zinc in powder.

On the other hand, the presence of oxides which are not reduced under the conditions in which the catalyst is being used, as the aluminum, chromium, magnesium, calcium, cadmium and silicon oxides is not noxious. A catalyst containing these additional oxides can be prepared by heating until decomposition a mixture of organic salts of zinc and said other metals whose oxides are not reduced under the conditions in which the catalyst is to be used.

Beside being active in respect of the reactions stated above for the synthesis of methanol and for the production of hydrogen, this type of catalyst is also active in respect of other reactions in which participate carbon monoxide and carbon dioxide for instance:

$$HCOOH = CO_2 + H_2$$
$$2CH_3COOH = CH_3COCH_3 + CO_2 + H_2O$$
$$CH_3COOH + HCOOH = CH_3CHO + H_2O + CO_2$$

and many similar reactions, in which ketones and aldehydes are formed, and simultaneously carbon dioxide is developed.

The catalysts now proposed can also advantageously be used for carrying on reactions, under pressure, because they do not promote noxious reducing reactions, which are highly favoured by pressure, as the formation of methane by reducing carbon monoxide with hydrogen and the formation of elementary carbon by simultaneous oxidation and reduction of the carbon monoxide only ($2CO = C + CO_2$).

On account of their property of favouring the conversion of water gas as well as the synthesis of methanol from carbon monoxide and hydrogen, under the same temperature and pressure, the catalysts now proposed make it possible to use in the synthesis of methanol water gas with a lower hydrogen content than that which would be required theoretically. This lack of hydrogen may be remedied by adding a small quantity of steam, so that the two interdependent equilibriums allow the practical realisation of the following reaction:

$$3CO + 3H_2 + H_2O = CO_2 + 2CH_3OH$$

the carbon dioxide developed is easily eliminated on account of its very high solubility in methyl alcohol, under pressure.

I claim:

1. The process of preparing a zinc oxide catalyst, which comprises decomposing by heat a molten anhydrous organic zinc salt having a decomposing temperature above its melting temperature.

2. A catalyst for chemical reactions in which participate carbon oxides and hydrogen, containing zinc oxide prepared by heating anhydrous zinc acetate until it melts and then decomposes from molten state.

3. A catalyst containing oxides of zinc and other metals which cannot be reduced under the conditions in which the catalyst is used, all said oxides being prepared by heating anhydrous organic salts of zinc and said other metals whose melting points are below their decomposing temperatures, until said salts first melt and then decompose from molten state.

4. A process for preparing catalysts for chemical reactions in which participate carbon oxides and hydrogen, which comprises heating anhydrous organic zinc salts having a melting point lower than their decomposing temperatures until they melt and then decompose from molten state.

5. A method for preparing catalysts for chemical reactions in which participate carbon oxides and hydrogen, which comprises heating anhydrous zinc acetate until it melts and then decomposes from molten state.

6. A process for the preparation of catalysts for chemical reactions in which participate carbon oxides and hydrogen, which comprises preparing a mixture of oxides of zinc and other metals which cannot be reduced under the conditions in which the catalyst is used, by heating a mixture of anhydrous organic salts of zinc and said other metals whose melting points are below their decomposing temperatures, until said salts melt and then decompose from molten state.

7. A process for preparing catalysts for chemical reactions in which participate carbon oxides and hydrogen, which comprises heating under pressure anhydrous organic zinc salts having a melting point lower than their decomposing temperatures, until said salts melt and then decompose from molten state.

8. A process for the preparation of catalysts for chemical reactions in which participate carbon oxides and hydrogen, which comprises preparing a mixture of oxides of zinc and the other metals which cannot be reduced under the conditions in which the catalyst is used, by heating under pressure a mixture of anhydrous organic salts of zinc and said other metals whose melting points are below their decomposing temperatures, until said salts melt and then decompose from molten state.

GIULIO NATTA.